United States Patent
Medina et al.

(10) Patent No.: US 11,688,124 B2
(45) Date of Patent: *Jun. 27, 2023

(54) METHODS AND APPARATUS RENDERING IMAGES USING POINT CLOUDS REPRESENTING ONE OR MORE OBJECTS

(71) Applicant: Nevermind Capital LLC, Wilmington, DE (US)

(72) Inventors: Hector Medina, Laguna Beach, CA (US); David Cole, Aliso Viejo, CA (US); Alan Moss, Laguna Beach, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,994

(22) Filed: Feb. 14, 2022

(65) Prior Publication Data

US 2022/0245884 A1    Aug. 4, 2022

Related U.S. Application Data

(63) Continuation of application No. 16/512,369, filed on Jul. 15, 2019, now Pat. No. 11,250,612, which is a
(Continued)

(51) Int. Cl.
*G06T 15/04*    (2011.01)
*H04N 5/272*    (2006.01)
(Continued)

(52) U.S. Cl.
CPC ............. *G06T 15/04* (2013.01); *H04N 5/272* (2013.01); *H04N 13/111* (2018.05); *H04N 13/189* (2018.05)

(58) Field of Classification Search
CPC ...... G06T 15/04; H04N 5/272; H04N 13/111; H04N 13/189; H04N 13/239; H04N 13/243; H04N 13/246
See application file for complete search history.

(56) References Cited

U.S. PATENT DOCUMENTS

2012/0176364 A1    7/2012    Schardt
2014/0226895 A1    8/2014    Babin
(Continued)

*Primary Examiner* — Jacinta M Crawford
*Assistant Examiner* — Andrew Shin
(74) *Attorney, Agent, or Firm* — Blank Rome LLP

(57) ABSTRACT

A background image is also generated, e.g., by filling portions of a captured image where a foreground object was extracted and communicated to the playback device, Foreground objects are identified and point cloud representations of the foreground objects are generated and communicated to a playback device so that they can be used in generating images including the background which is communicated separately. In the case of a point cloud representation a number of points in an environment, e.g., 3D space, are communicated to the playback device along with color information. Thus in some embodiments a foreground object is represented as a set of points with corresponding color information on a per point basis. Foreground object information is communicated and processed in some embodiments at a different rate, e.g., faster rate, then the background textures. The playback device renders images which are sent to the display by first rendering a background layer using the communicated background information, e.g., background texture(s), UV map and environmental geometry, e.g., mesh, to which the background textures are applied.

20 Claims, 11 Drawing Sheets

Related U.S. Application Data continuation-in-part of application No. 16/510,869, filed on Jul. 12, 2019.

(60) Provisional application No. 62/697,408, filed on Jul. 13, 2018, provisional application No. 62/697,404, filed on Jul. 13, 2018, provisional application No. 62/697,290, filed on Jul. 12, 2018.

(51) Int. Cl.
*H04N 13/189* (2018.01)
*H04N 13/111* (2018.01)

(56) References Cited

U.S. PATENT DOCUMENTS

| | | | |
|---|---|---|---|
| 2017/0032192 A1* | 2/2017 | Teichman | G06K 9/6256 |
| 2017/0094196 A1 | 3/2017 | Adsumilli | |
| 2017/0278231 A1 | 9/2017 | Narasimha | |
| 2017/0372449 A1 | 12/2017 | Yarvis | |
| 2018/0220048 A1* | 8/2018 | Tamir | H04N 13/25 |
| 2020/0082595 A1 | 3/2020 | Okada | |
| 2020/0314449 A1 | 10/2020 | Fleureau | |

* cited by examiner

METHODS AND APPARATUS RENDERING IMAGES USING POINT CLOUDS REPRESENTING ONE OR MORE OBJECTS

RELATED APPLICATIONS

The present application is a continuation of U.S. application Ser. No. 16/512,369, which was filed on Jul. 15, 2019, which claims the benefit of U.S. Provisional Application Ser. No. 62/697,404, which was filed on Jul. 13, 2018 and the benefit of U.S. Provisional Application Ser. No. 62/697,408 which was filed on Jul. 13, 2018 and is a continuation-in-part of U.S. patent application Ser. No. 16/510,869 which was filed on Jul. 12, 2019 and which claims benefit of U.S. Provisional Application Ser. No. 62/697,290 which was filed on Jul. 12, 2018 with each of the preceding patent applications hereby being expressly incorporated by reference in their entirety.

FIELD

The present invention relates to methods and apparatus for capturing, streaming and/or playback of content, e.g., content which can be used to simulate an environment and/or ongoing action in an environment.

BACKGROUND

In order to simulate an environment images are sometimes captured in the environment and transmitted to a playback device. The images may then be applied to a model of the environment as a texture, e.g., using information sometimes called a texture map or UV map which indicates how to apply the captured image as a texture to the model of the environment.

The capture and stream of images of an environment can be very data intensive particularly if the images are high resolution images of the type now expected by many viewers. The transmission of a large amount of data associated with such an approach can be problematic given data transmission constraints.

In view of the above it should be appreciated that there is a need for improved methods and/or apparatus for communicating information about an environment, e.g., captured image content, to a playback device.

SUMMARY

In various embodiments a content transmission system captures images of an environment. The images are analyzed to identify objects which move. Such objects are considered foreground objects since they pass in front of other objects which they may obscure. The foreground objects are extracted from a captured image and the areas of the captured image where the foreground object was extracted are patched with content from another image captured when the foreground object was not blocking the view of the area from which the image of the foreground object was extracted. In this way a background image without occlusions can be constructed from multiple sequential images which are captured.

In other embodiments, e.g., some augmented reality embodiments, the background is captured separately and foreground objects captured by elsewhere are inserted as part of a virtual reality or immersive experience into the environment which supplied the background objects. In such a case the foreground objects maybe extracted from images captured at one site, e.g., at a basketball game, and presented in images to a user of a playback device as if they were in an environment where background images were captured.

For example in one augmented reality embodiment basketball players and a ball which are treated as foreground objects are captured and extracted from images taken at a basketball game and then combined with images of an different environment such as images captured in a room to give the impression that the basketball players are playing in the living room, e.g., on a coffee table.

While the foreground objects may move and change their location relatively frequently, the background in many situations tends to be relatively stable. Accordingly, it should be appreciated that if efficient methods for communicating and updating information about foreground objects could be achieved considerable efficiencies could be achieved in terms of data transmission and rendering of background images portions since the background often makes up a large portion of an environment.

In various embodiments background image content is captured as video and optionally processed to remove occlusions (blocked areas) caused by the presence of foreground objects. Background texture information, e.g., images of an environment, are communicated to a playback device along with a UV map and geometry. The UV map indicates how the background textures or texture are applied to the geometry of the environment being simulated by the playback device.

In accordance with one feature of the invention, in some embodiments foreground objects, e.g., basketball players, a ball, etc. are represented not as textures and texture maps but rather as point clouds, e.g., one point cloud per identified foreground object.

In the case of a point cloud representation a number of points in an environment, e.g., 3D space, are communicated to the playback device along with color information. Thus in some embodiments a foreground object is represented as a set of points with corresponding color information on a per point basis.

Foreground object information is communicated and processed in some embodiments at a different rate, e.g., faster rate, then the background textures. The playback device renders images which are sent to the display by first rendering a background layer using the communicated background information, e.g., background texture(s), UV map and environmental geometry, e.g., mesh, to which the background textures are applied.

Foreground objects are rendered using a point cloud rendering approach rather than a mesh model based approach and then applied over the background image to generate an output image which communicated to a display.

In the point cloud rendering approach to object rending the individual location of the points (X,Y,Z) in the 3D space is taken into consideration. The points are located in 3D space and then an outside border is determined, e.g., a line is drawn around the outside points of an object. The area between the points is divided into faces, sometimes also called tiles, with each face corresponding to a single point in the point cloud. The color of the point in the point cloud corresponding to the face is then used to determine the color of the face to which a point corresponds.

The point cloud rendered foreground objects are then superimposed on the background as a foreground layer. In this way, images of players, the ball and other foreground images will be included in the rendered output image which is then output to a display device.

As the position of foreground images changes, e.g., as determined from images captured by cameras in the environment from which the foreground images are captured, the location of the points in the point cloud representing a foreground object will change. In some embodiments the point cloud information for a foreground object will be retransmitted each time the location of pixels corresponding to the foreground object move. However in other embodiments, the full point cloud for an identified foreground object need not be retransmitted and instead difference information is transmitted to the playback device indicating changes in position and/or color of one or more pixels in a previously identified point cloud.

Given that foreground objects normally occupy only a small portion of the total area of an environment, the methods and apparatus of the invention can provide data and/or processing efficiencies over systems where the entire texture of an environment is transmitted for each frame time. Furthermore since the rate at which the background is rendered can be slower than the rate at which foreground objects are rendered and superimposed on the background processing efficiencies in the playback device can be achieved. This can be important in high resolution applications where a device has difficulty rendering high resolution images at a high frame rate since rendering of the foreground objects can often be less processor intensive than rendering an image of the entire environment from scratch.

Numerous variations on the above described methods and apparatus are possible.

DETAILED DESCRIPTION

Figure 1:
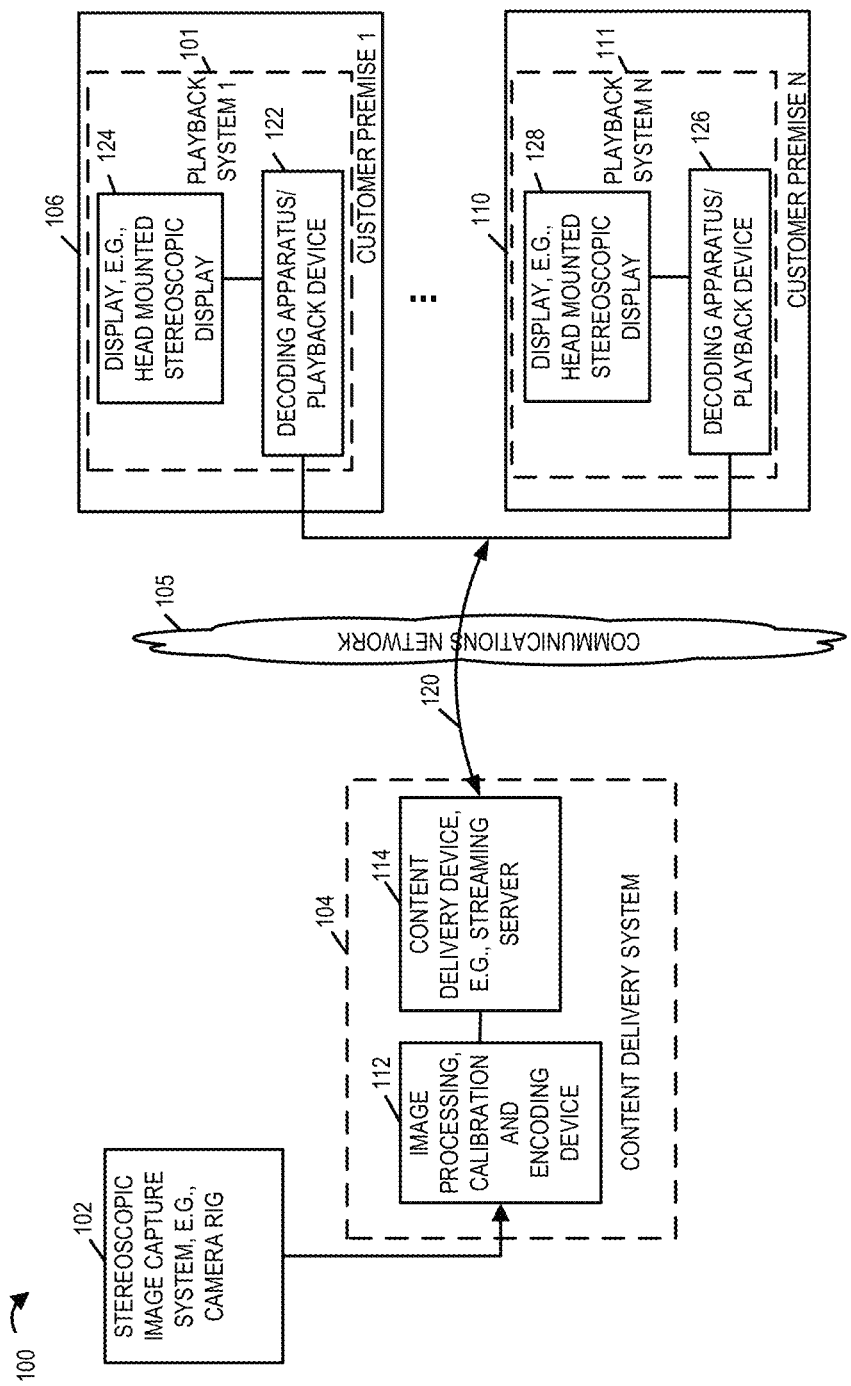
FIG. 1 illustrates an exemplary system implemented in accordance with some embodiments of the invention which can be used to capture, stream content, and output content to one or more users.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an image processing, calibration and encoding apparatus 112 and a content delivery device 114, e.g. a streaming server 114. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/or environmental information to the content delivery device 114 which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content may be, and sometimes is, a function of feedback information such as viewer head position and/or user selection of a position at the event corresponding to a camera rig 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that although a single camera rig 102 is shown in FIG. 1, multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content to deliver the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server 114 are shown as separate physical devices in the FIG. 1 example, in some embodiments they are implemented as a single device which encodes and streams content. The encoding process may be a 3d, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of playback systems, e.g., devices/players, e.g., apparatus that can decode and playback/display the imaging content streamed by the content streaming device 114. Customer premise 1 106 includes a playback system 101 that includes a decoding apparatus/playback device 122 coupled to a display device 124. Customer premise N 110 includes a playback system 111 including a decoding apparatus/playback device 126 coupled to a display device 128. In some embodiments the display devices 124, 128 are head mounted stereoscopic display devices. In various embodiments the playback system 101 is a headmounted system supported by a strap that is worn around the user's head. Thus, in some embodiments, customer premise 1 106 includes playback system 1 101 which includes decoding apparatus/playback device 122 coupled to display 124, e.g., a head mounted stereoscopic display, and customer premise N 110 includes playback system N 111 which includes decoding apparatus/playback device 126 coupled to display 128, e.g., a head mounted stereoscopic display, In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 3. A system/playback device such as the one illustrated in FIG. 3 can be used as any of the decoding apparatus/playback devices 122, 126.

Figure 2:
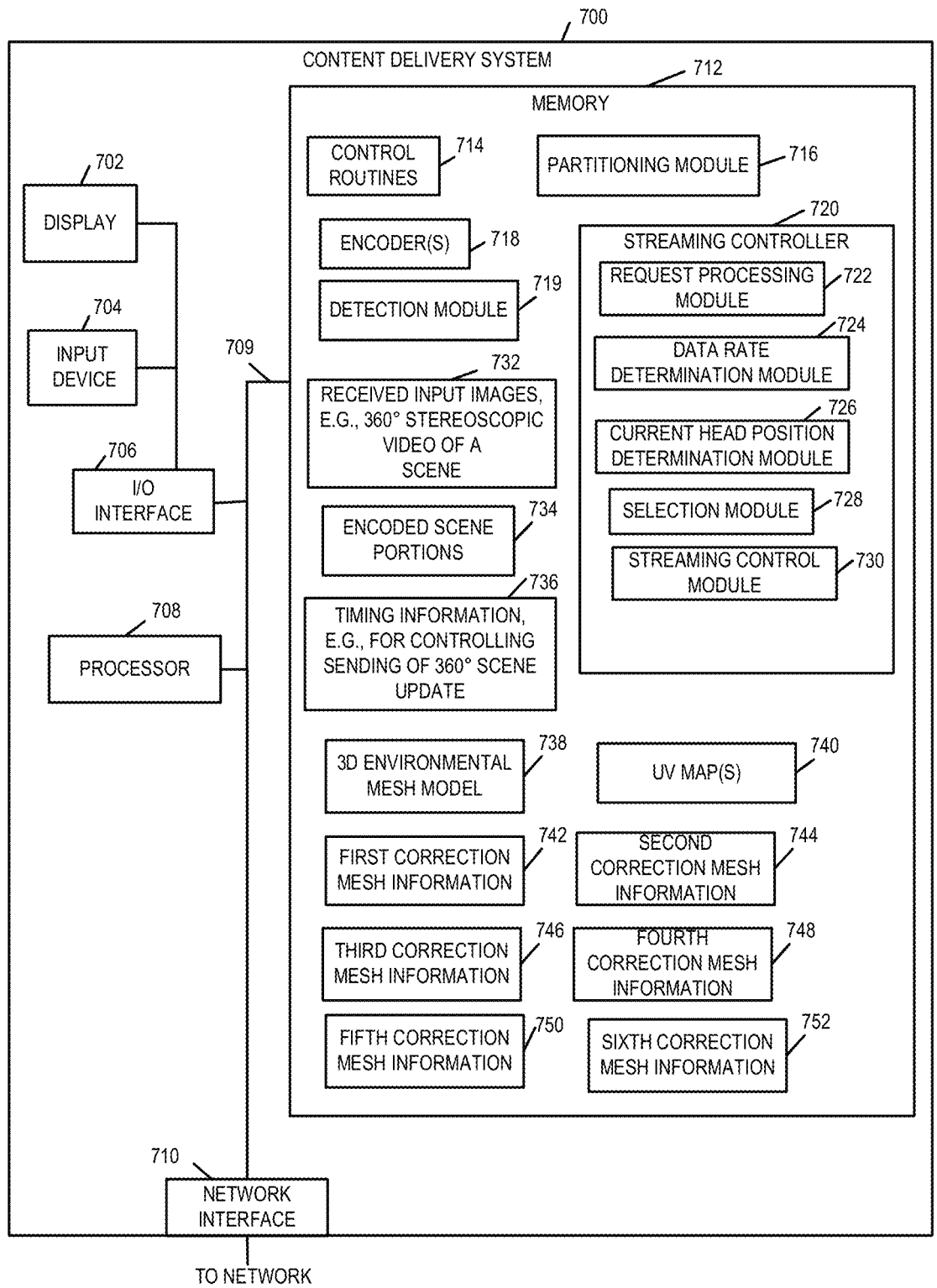
FIG. 2 illustrates an exemplary content delivery system with encoding capability that can be used to encode and stream content in accordance with the features of the invention.

FIG. 2 illustrates an exemplary content delivery system 700 with encoding capability that can be used to encode and stream content in accordance with the features of the invention.

The system 700 may be used to perform object detection, encoding, storage, and transmission and/or content output in accordance with the features of the invention. The content delivery system 700 may be used as the system 104 of FIG. 1. While the system shown in FIG. 2 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the content delivery system 700 to implement the partitioning, encoding, storage, and streaming/transmission and/or output operations in accordance with the invention.

The memory 712 includes various modules, e.g., routines, which when executed by the processor 707 control the content delivery system 700 to implement the immersive stereoscopic video acquisition, encoding, storage, and transmission and/or output methods in accordance with the invention. The memory 712 includes control routines 714, a partitioning module 706, encoder(s) 718, a detection module 719, a streaming controller 720, received input images 732, e.g., 360 degree stereoscopic video of a scene, encoded scene portions 734, timing information 736, an environmental mesh model 738, UV maps(s) 740 and a plurality of correction mesh information sets including first correction mesh information 742, second correction mesh information 744, third correction mesh information 746, fourth correction mesh information 748, fifth correction mesh information 750 and sixth correction mesh information 752. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The detection module 719 is configured to detect a network controlled switch from streaming content from a current camera pair, e.g., first stereoscopic camera pair, to another camera pair, e.g., a second or third stereoscopic camera pair. That is the detection module 719 detects if the system 700 has switched from streaming content stream generated using images captured by a given stereoscopic camera pair, e.g., a first stereoscopic camera pair, to streaming content stream generated using images captured by another camera pair. In some embodiments the detection module 719 is further configured to detect a user controlled change from receiving a first content stream including content from the first stereoscopic camera pair to receiving a second content stream including content from the second stereoscopic camera pair, e.g., detecting a signal from user playback device indicating that the playback device is attached to a different content stream than a content to which it was attached previously. The streaming controller 720 is configured to control streaming of encoded content for delivering the encoded image content to one or more customer devices, e.g., over the communications network 105.

The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives and processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured to communicate at least a sufficient number of the N portions to the playback device on a periodic basis to allow the playback device to fully refresh a 360 degree version of said scene at least once during each refresh period.

Figure 4:
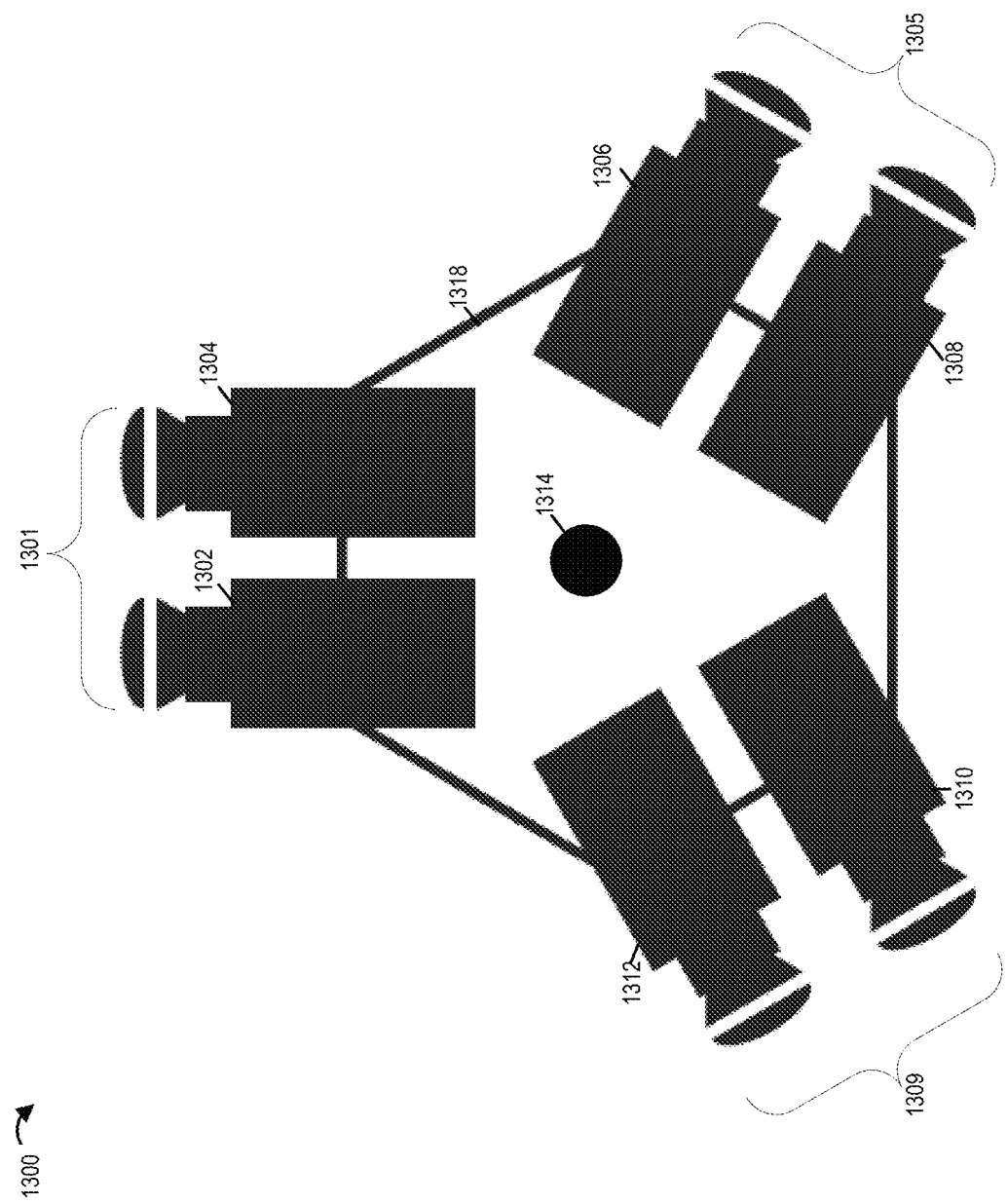
FIG. 4 illustrates a camera rig including multiple camera pairs for capturing left and right eye images corresponding to different 120 degree sectors of a 360 degree field of view along with a camera or cameras directed towards the sky to capture a sky view.

In some embodiments streaming controller 720 is configured to control the system 700 to transmit, e.g., via a transmitter in the network interface 710, a stereoscopic content stream (e.g., encoded content stream 734) including encoded images generated from image content captured by one or more cameras, e.g., cameras of stereoscopic camera pairs such as illustrated in FIG. 4. In some embodiments streaming controller 720 is configured to control the system 700 to transmit, to one or more playback devices, an environmental mesh model 738 to be used in rendering image content. In some embodiments streaming controller 720 is further configured to transmit to a playback device a first UV map to be used for mapping portions of images captured by a first stereoscopic camera pair to a portion of the environmental mesh model as part of an image rendering operation.

In various embodiments the streaming controller 720 is further configured to provide (e.g., transmit via a transmitter in the network interface 710) one or more sets of correction mesh information, e.g., first, second, third, fourth, fifth, sixth, correction mesh information (742, 744, 746, 748, 750, 752) to a playback device. In some embodiments the first correction mesh information 742 is for use in rendering image content captured by a first camera of a first stereoscopic camera pair, the second correction mesh information 744 is for use in rendering image content captured by a second camera of the first stereoscopic camera pair, the third correction mesh information 746 is for use in rendering image content captured by a first camera of a second stereoscopic camera pair, the fourth correction mesh information 748 is for use in rendering image content captured by a second camera of the second stereoscopic camera pair, the fifth correction mesh information 750 is for use in rendering image content captured by a first camera of a third stereoscopic camera pair, the sixth correction mesh information 752 is for use in rendering image content captured by a second camera of the third stereoscopic camera pair. In some embodiments the streaming controller 720 is further configured to indicate, e.g., by sending a control signal, to the playback device that the third and fourth correction mesh information (746, 748) should be used when content captured by the second stereoscopic camera pair is streamed to the playback device instead of content from the first stereoscopic camera pair. In some embodiments the streaming controller 720 is further configured to indicate to the playback device that the third and fourth correction mesh information (746, 748) should be used in response to the detection module 719 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 712 further includes the environmental mesh model 738, UV map(s) 740, and sets of correction mesh information including first correction mesh information 742, second correction mesh information 744, third correction mesh information 746, fourth correction mesh information 748, fifth correction mesh information 750 and sixth correction mesh information 752. The system 700 provides the environmental mesh model 738 to one or more playback devices for use in rendering image content. The UV map(s) 740 include at least a first UV map to be used for mapping portions of images captured by the first stereoscopic camera pair to a portion of the environmental mesh model 738 as part of an image rendering operation. The first correction mesh information 742 includes information generated based on measurement of one or more optical characteristics of a first lens of said first camera of the first stereoscopic camera pair and the second mesh correction information 744 includes information generated based on measurement of one or more optical characteristic of a second lens of said second camera of the first stereoscopic camera pair. In some embodiments the first and second stereoscopic camera pairs correspond to a forward viewing direction but different locations at an area or event location where content is being captured for streaming.

Figure 9:
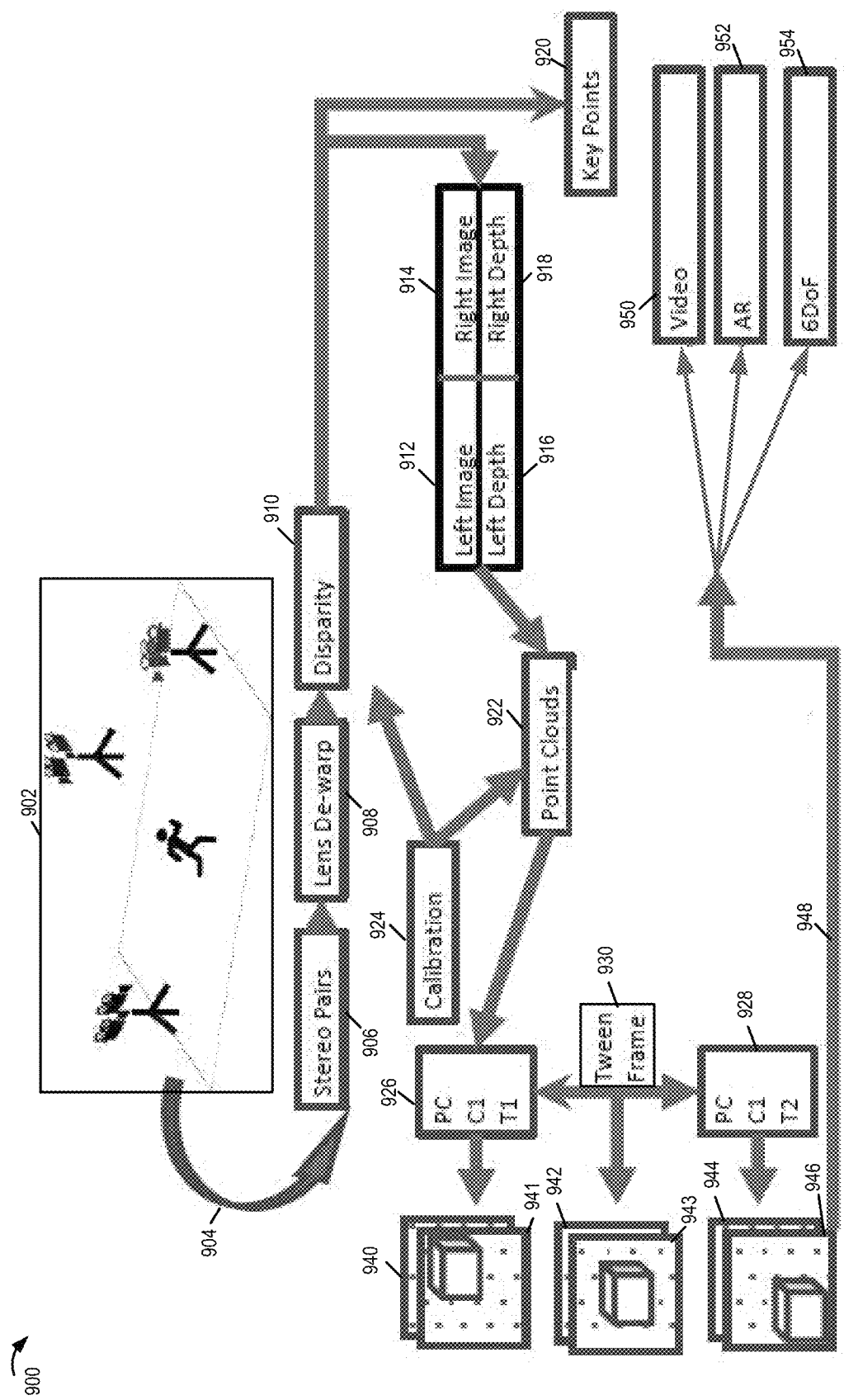
FIG. 9 shows a method of operating a content capture and delivery system such as the one shown in FIG. 1 for capturing images and generating point clouds of objects, e.g., foreground objects and which can also provide background image content in cases where the background is captured at the same environment as the foreground objects.
Figure 10:
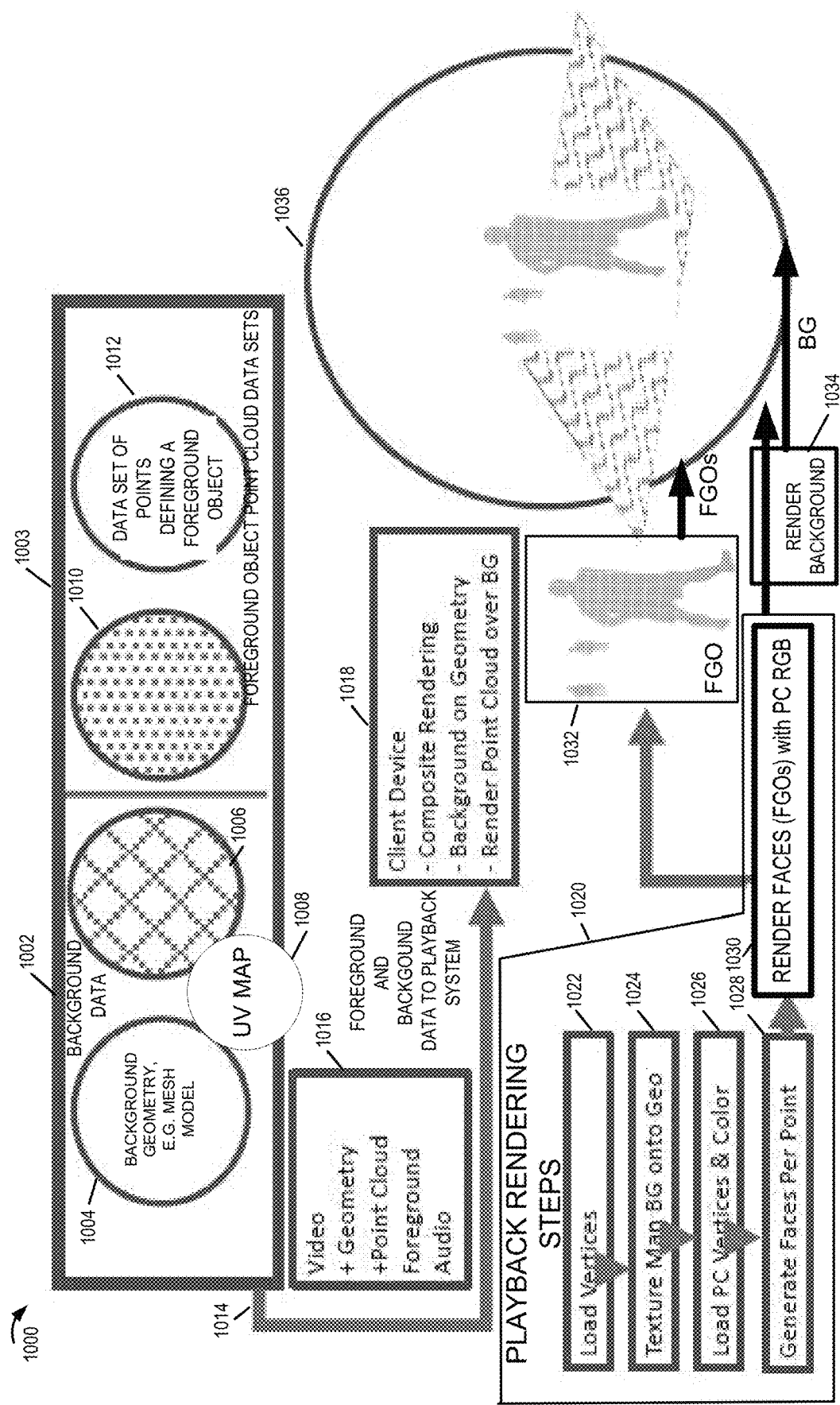
FIG. 10 shows steps of a method which can be implemented by a playback device which received background and foreground information that can be used in rendering background images using a geometry and where foreground point cloud representations of objects can be used to render foreground objects which are combined with background images.

In some embodiments the processor 708 is configured to perform the various functions corresponding to steps discussed in flowcharts and/or drawings of FIG. 9 and/or FIG. 10. In some embodiments the processor 708 uses routines and information stored in memory 712 to perform various functions and control the system 700 to operate in accordance with the methods of the present invention. In one embodiments the processor 708 is configured to control the system 700 to provide the first correction mesh information and the second correction mesh information to a playback device, the first correction mesh information being for use in rendering image content captured by the first camera, the second correction mesh information being for use in rendering image content captured by the second camera. In some embodiments the first stereoscopic camera pair corresponds to a first direction and the processor 708 is further configured to control the system 700 to transmit a stereoscopic content stream including encoded images generated from image content captured by the first and second cameras. In some embodiments the processor 708 is further configured to transmit to the playback device an environmental mesh model 738 to be used in rendering image content. In some embodiments the processor 708 is further configured to transmit to the playback device a first UV map 740 to be used for mapping portions of images captured by the first stereoscopic camera pair to a portion of the environmental mesh model as part of an image rendering operation. In some embodiments the processor 708 is further configured to control the system 700 to provide third correction mesh information 746 and fourth correction mesh information 748 to the playback device, the third correction mesh information 746 being for use in rendering image content captured by a first camera of a second stereoscopic camera pair, the fourth correction mesh information 748 being for use in rendering image content captured by a second camera of the second stereoscopic camera pair. In some embodiments the processor 708 is further configured to control the system 700 to indicate (e.g., transmit via network interface 710) to the playback device that the third and fourth correction mesh information (746, 748) should be used when content captured by the second camera pair is streamed to the playback device instead of content from the first camera pair. In some embodiments the processor 708 is further configured to control the system 700 to indicate to the playback device that the third and fourth correction mesh information (746, 748) should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments the processor 708 is further configured to control the system 700 to system to provide the fifth and sixth correction mesh information (750, 752) to the playback device, the fifth correction mesh information 750 being for use in rendering image content captured by the first camera of the third stereoscopic camera pair, the sixth correction mesh information 752 being for use in rendering image content captured by the second camera of the third stereoscopic camera pair.

Figure 3:
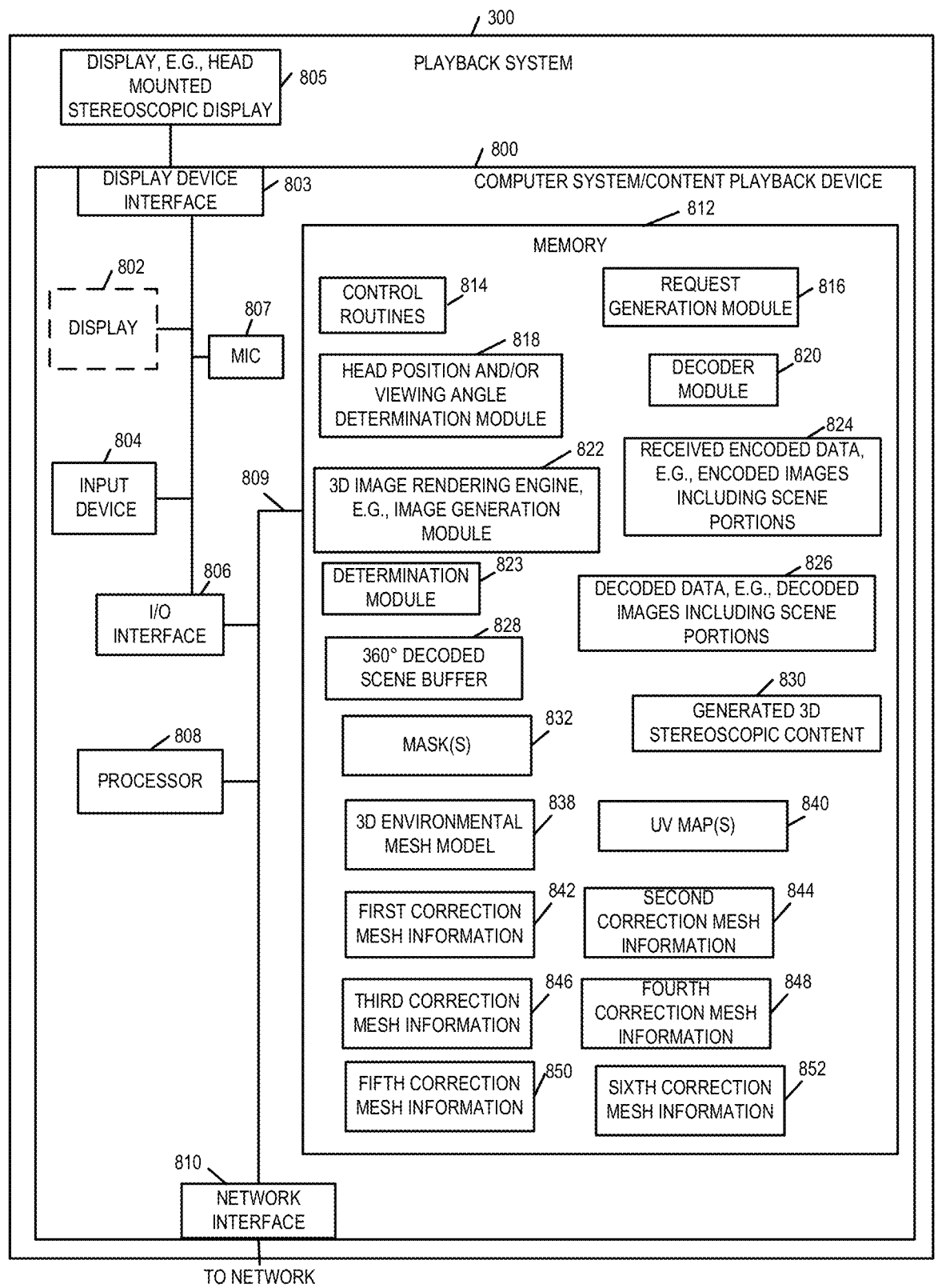
FIG. 3 illustrates an exemplary content playback system that can be used to receive, decode and display the content streamed by the system of FIG. 2.

FIG. 3 illustrates a playback system 300 implemented in accordance with an exemplary embodiment of the present invention. Playback system 300 is, e.g., playback system 101 or playback system 111 of FIG. 1. Exemplary playback system 300 includes computer system/playback device 800 coupled to display 805, e.g., a head mounted stereoscopic display. Computer system/playback device 800 implemented in accordance with the present invention can be used to receive, decode, store and display imaging content received from a content delivery system such as the one shown in FIGS. 1 and 2. The playback device 800 may be used with a 3D head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, microphone (mic) 807, input/output (I/O) interface 806, a processor 808, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803.

Via the I/O interface 806, the system 800 can be coupled to external devices to exchange signals and/or information with other devices. In some embodiments via the I/O interface 806 the system 800 can receive information and/or images from an external device and output information and/or images to external devices. In some embodiments via the interface 806 the system 800 can be coupled to an external controller, e.g., such as a handheld controller.

The processor 808, e.g., a CPU, executes routines 814 and modules in memory 812 and uses the stored information to control the system 800 to operate in accordance with the invention. The processor 808 is responsible for controlling the overall general operation of the system 800. In various embodiments the processor 808 is configured to perform functions that have been discussed as being performed by the playback system 800.

Via the network interface 810 the system 800 communicates and/or receives signals and/or information (e.g., including encoded images and/or video content corresponding to a scene) to/from various external devices over a communications network, e.g., such as communications network 105. In some embodiments the system receives one or more content streams including encoded images captured by one or more different cameras via the network interface 810 from the content delivery system 700. The received content stream may be stored as received encoded data, e.g., encoded images 824. In some embodiments the interface 810 is configured to receive a first encoded image including image content captured by a first camera and a second encoded image corresponding to a second camera. The network interface 810 includes a receiver and a transmitter via which the receiving and transmitting operations are performed. In some embodiments the interface 810 is configured to receive correction mesh information corresponding to a plurality of different cameras including first correction mesh information 842, second correction mesh information 844, third correction mesh information 846, fourth correction mesh information 848, fifth correction mesh information 850 and sixth correction mesh information 852 which are then stored in memory 812. Furthermore in some embodiments via the interface 810 the system receives one or more mask(s) 832, an environmental mesh model 838, UV maps(s) 840 which are then stored in memory 812.

The memory 812 includes various modules, e.g., routines, which when executed by the processor 808 control the playback device 800 to perform decoding and output operations in accordance with the invention. The memory 812 includes control routines 814, a request for content generation module 816, a head position and/or viewing angle determination module 818, a decoder module 820, a stereoscopic image rendering engine 822 also referred to as a 3D image generation module, a determination module 823, and data/information including received encoded image content 824, decoded image content 826, a 360 degree decoded scene buffer 828, generated stereoscopic content 830, mask(s) 832, an environmental mesh model 838, UV maps(s) 840 and a plurality of received correction mesh information sets including first correction mesh information 842, second correction mesh information 844, third correction mesh information 846, fourth correction mesh information 848, fifth correction mesh information 850 and sixth correction mesh information 852.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data, e.g., decoded images 826. The decoded image data 826 may include decoded stereoscopic scene and/or decoded scene portions. In some embodiments the decoder 820 is configured to decode the first encoded image to generate a first decoded image and decode the second received encoded image to generate a second decoded image. The decoded first and second images are included in the stored decoded image images 826.

The 3D image rendering engine 822 performs the rendering operations (e.g., using content and information received and/or stored in memory 812 such as decoded images 826, environmental mesh model 838, UV map(s) 840, masks 832 and mesh correction information) and generates 3D image in accordance with the features of the invention for display to the user on the display 802 and/or the display device 805. The generated stereoscopic image content 830 is the output of the 3D image generation engine 822. In various embodiments the rendering engine 822 is configured to perform a first rendering operation using the first correction information 842, the first decoded image and the environmental mesh model 838 to generate a first image for display. In various embodiments the rendering engine 822 is further configured to perform a second rendering operation using the second correction information 844, the second decoded image and the environmental mesh model 838 to generate a second image for display. In some such embodiments the rendering engine 822 is further configured to use a first UV map (included in received UV map(s) 840) to perform the first and second rendering operations. The first correction information provides information on corrections to be made to node positions in the first UV map when the first rendering operation is performed to compensate for distortions introduced into the first image by a lens of the first camera and the second correction information provides information on corrections to be made to node positions in the first UV map when the second rendering operation is performed to compensate for distortions introduced into the second image by a lens of the second camera. In some embodiments the rendering engine 822 is further configured to use a first mask (included in mask(s) 832) to determine how portions of the first image are combined with portions of a first image corresponding to a different field of view as part of the first rendering operation when applying portions of the first image to a surface of the environmental mesh model as part of the first rendering operation. In some embodiments the rendering engine 822 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 830 includes the first and second images (e.g., corresponding to left and right eye views) generated as a result of the first and second rendering operation. In some embodiments the portions of a first image corresponding to a different field of view correspond to a sky or ground field of view. In some embodiments the first image is a left eye image corresponding to a forward field of view and the first image corresponding to a different field of view is a left eye image captured by a third camera corresponding to a side field of view adjacent the forward field of view. In some embodiments the second image is a right eye image corresponding to a forward field of view and wherein the second image corresponding to a different field of view is a right eye image captured by a fourth camera corresponding to a side field of view adjacent the forward field of view. Thus the rendering engine 822 renders the 3D image content 830 to the display. In some embodiments the operator of the playback device 800 may control one or more parameters via input device 804 and/or select operations to be performed, e.g., select to display 3D scene.

The network interface 810 allows the playback device to receive content from the streaming device 114 and/or communicate information such as view head position and/or position (camera rig) selection indicating selection of particular viewing position at an event. In some embodiments the decoder 820 is implemented as a module. In such embodiments when executed the decoder module 820 causes received images to be decoded while 3D image rendering engine 822 causes further processing of the images in accordance with the present invention and optionally stitching of images together as part of the presentation process.

In some embodiments the interface 810 is further configured to receive additional mesh correction information corresponding to a plurality of different cameras, e.g., third, fourth, fifth and sixth mesh correction information. In some embodiments the rendering engine 822 is further configured to use mesh correction information corresponding to a fourth camera (e.g., fourth mesh correction information 848) when rendering an image corresponding to a fourth camera, the fourth camera being one of the plurality of different cameras. The determination module 823 is configured to determine which mesh correction information is to be used by the rendering engine 822 when performing a rendering operation based on which camera captured image content is being used in the rendering operation or based an indication from a server indicating which mesh correction information should be used when rendering images corresponding to a received content stream. The determination module 823 may be implemented as part of the rendering engine 822 in some embodiments.

In some embodiments the modules and/or elements shown in the memory 712 of FIG. 2 and memory 812 of FIG. 3 are implemented as software modules. In other embodiments the modules and/or elements, while shown to be included in the memory, are implemented in hardware, e.g., as individual circuits with each element being implemented as a circuit for performing the function corresponding to the element. In still other embodiments the modules and/or elements are implemented using a combination of software and hardware.

While shown in FIGS. 2 and 3 to be included in the memory, the elements shown included in the system 700 and 800 can, and in some embodiments are, implemented fully in hardware within the processor, e.g., as individual circuits, of the corresponding device, e.g., within the processor 708 in case of the content delivery system and within the processor 808 in the case of playback system 800. In other embodiments some of the elements are implemented, e.g., as circuits, within the corresponding processors 708 and 808 with other elements being implemented, e.g., as circuits, external to and coupled to the processors. As should be appreciated the level of integration of modules on the processor and/or with some modules being external to the processor may be one of design choice. Alternatively, rather than being implemented as circuits, all or some of the elements may be implemented in software and stored in the memory, with the software modules controlling operation of the respective systems 700 and 800 to implement the functions corresponding to the modules when the modules are executed by their respective processors, e.g., processors 708 and 808. In still other embodiments, various elements are implemented as a combination of hardware and software, e.g., with a circuit external to the processor providing input to the processor which then under software control operates to perform a portion of a module's function.

Figure 7:
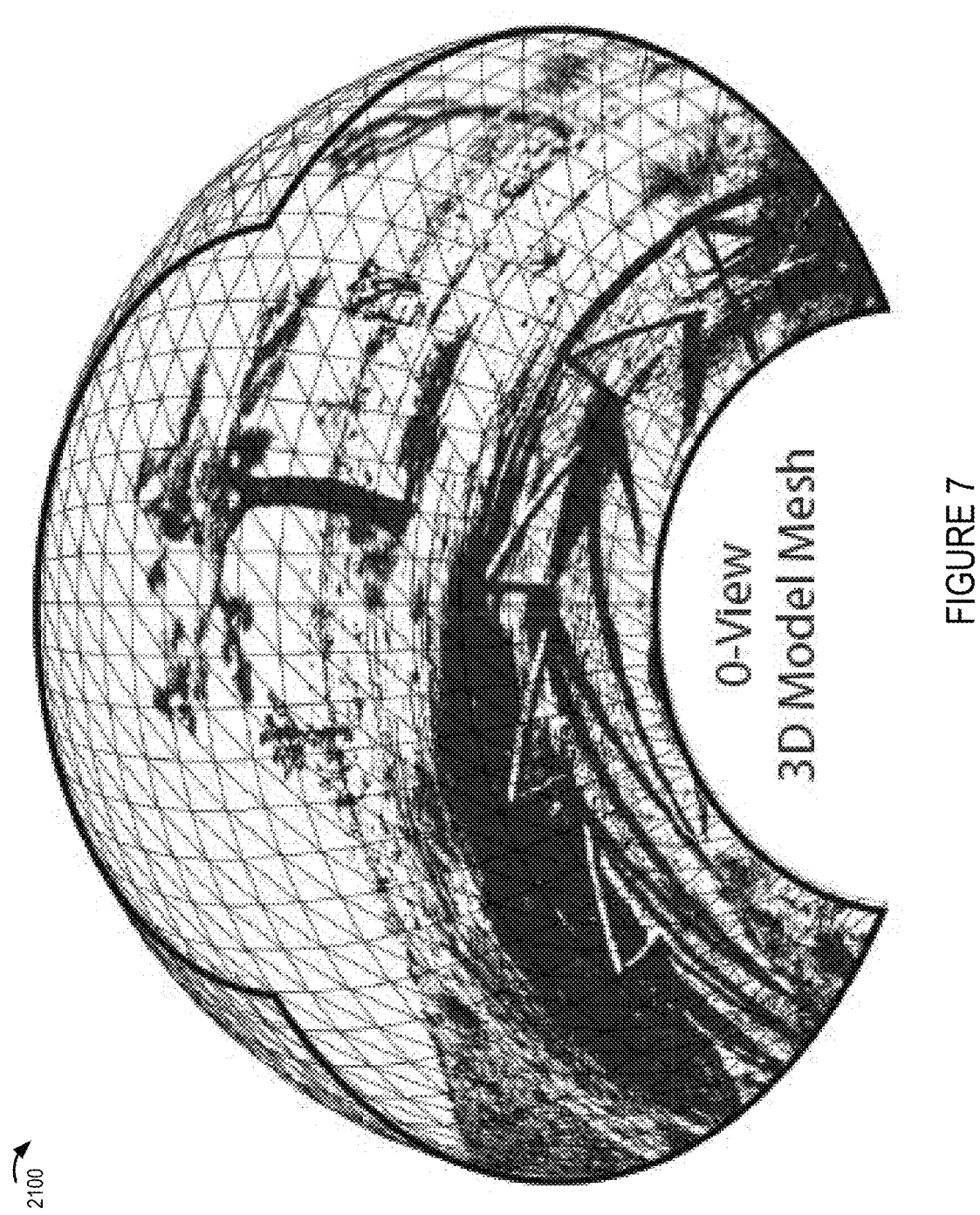
FIG. 7 shows an environmental mesh model corresponding to one sector of the camera rig with one of the images applied, e.g., projected, onto the environmental mesh to generate a background image.
Figure 8:
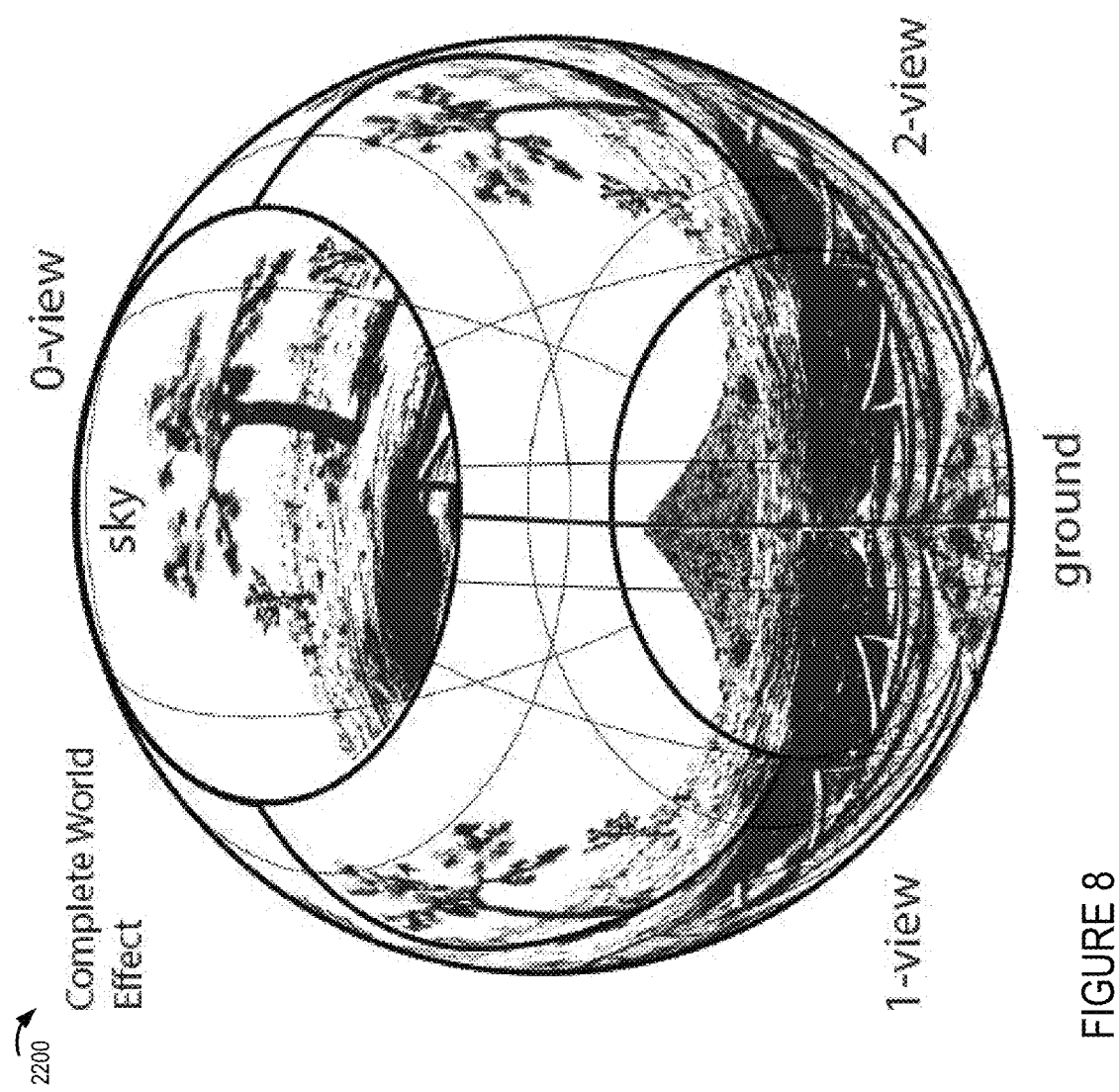
FIG. 8 shows application of images captured by cameras corresponding each of the sectors as well as the sky and ground cameras of the camera rig to simulate a complete 3D environment in the form of a sphere which can be used as a background to which foreground objects can be applied.

While shown in each of FIGS. 2 and 3 embodiments as a single processor, e.g., computer, it should be appreciated that each of the processors 708 and 808 may be implemented as one or more processors, e.g., computers. When one or more elements in the memory 712 and 812 are implemented as software modules, the modules include code, which when executed by the processor of the corresponding system (e.g., processor 708 and 808) configure the processor to implement the function corresponding to the module. In embodiments where the various modules shown in FIGS. 7 and 8 are stored in memory, the memory is a computer program product comprising a computer readable medium comprising code, e.g., individual code for each module, for causing at least one computer, e.g., processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 2 control and/or configure the system 700 or elements therein such as the processor 708, to perform the functions of corresponding steps of the methods of the present invention, e.g., such as those illustrated and/or described in the flowcharts. Similarly the modules illustrated in FIG. 3 control and/or configure the system 300 or 800 or elements therein such as the processor 808, to perform the functions of corresponding steps of the methods of the present invention, e.g., such as those illustrated and/or described in a flowchart.

To facilitate an understanding of the image capture process reference will now be made to the exemplary camera rig shown in FIG. 4. The camera rig 1300 can be used as the rig 102 of the FIG. 1 system and includes a plurality of stereoscopic camera pairs each corresponding to a different one of three sectors. The first stereoscopic camera pair 1301 includes a left eye camera 1302 (e.g., first camera) and a right camera 1304 (e.g., second camera) intended to capture images corresponding to those which would be seen by a left and right eye of a person positioned at the location of the first camera pair. Second stereoscopic camera pair 1305 corresponds to a second sector and includes left and right cameras 1306, 1308 while the third stereoscopic camera pair 1309 corresponds to a third sector includes left and right cameras 1310, 1312. Each camera is mounted in a fixed position in the support structure 1318. An upward facing camera 1314 is also included. A downward facing camera which is not visible in FIG. 4 may be included below camera 1314. Stereoscopic camera pairs are used in some embodiments to capture pairs of upward and downward images however in other embodiments a single upward camera and a single downward camera are used. In still other embodiments a downward image is captured prior to rig placement and used as a still ground image for the duration of an event. Such an approach tends to be satisfactory for many applications given that the ground view tends not to change significantly during an event. The output of the cameras of the rig 1300 are captured and processed.

Figure 5:
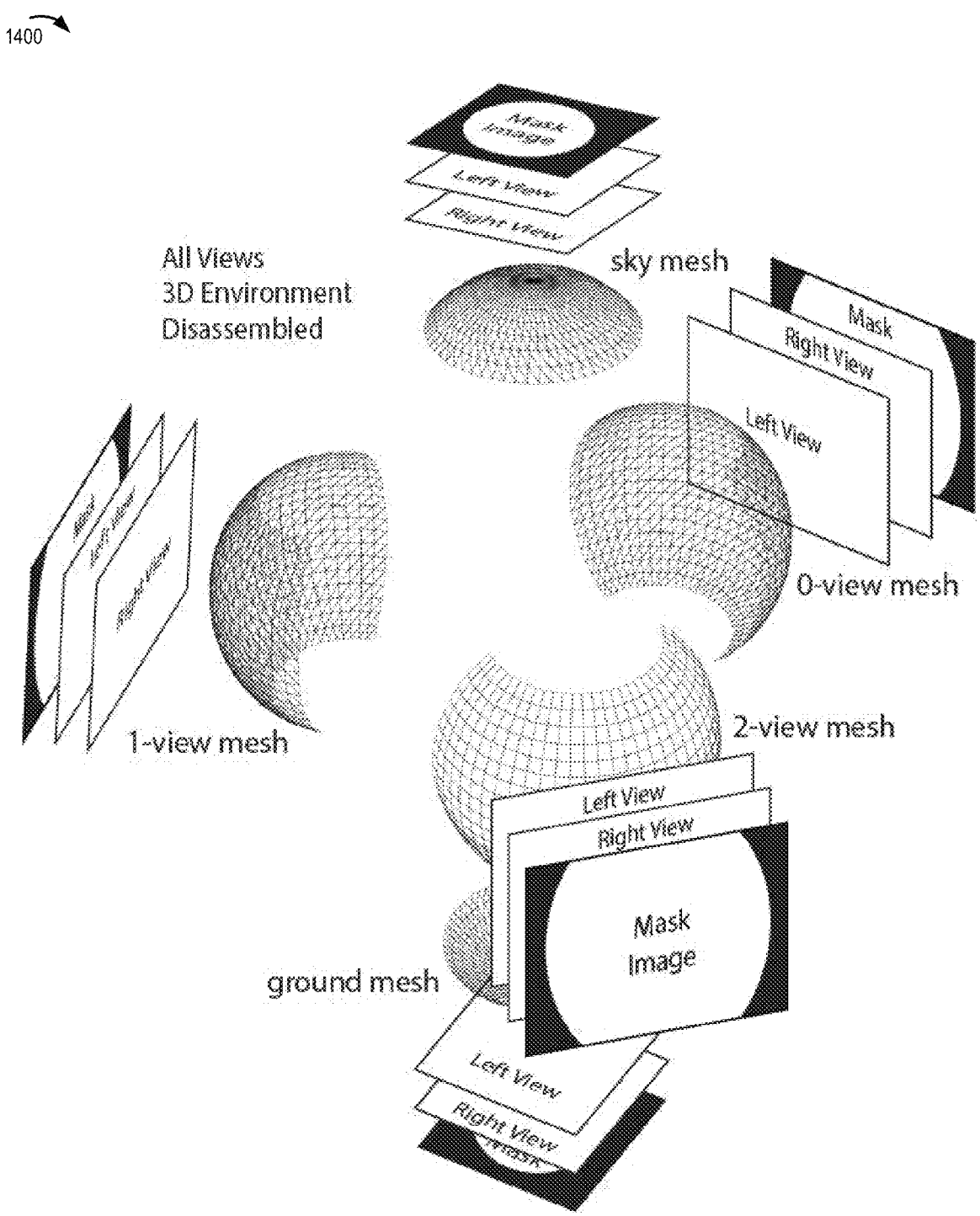
FIG. 5 shows how 5 different environmental mesh maps, corresponding to different camera views, can be combined to create a complete spherical view/environment onto which background images can be applied as part of a playback operation.

When the FIG. 4 camera rig 1300 is used each of the sectors corresponds to a known 120 degree viewing area with respect to the camera rig position, with the captured images from different sector pairs being seamed together based on the images know mapping to the simulated 3D environment. While a 120 degree portion of each image captured by a sector camera is normally used, the cameras capture a wider image corresponding to approximately a 180 degree viewing area. Accordingly, captured images may be subject to masking in the playback device as part of the 3D environmental simulation. FIG. 5 is a composite diagram 1400 showing how a 3D spherical environment can be simulated using environmental mesh portions which correspond to different camera pairs of the rig 102. Note that one mesh portion is shown for each of the sectors of the rig 102 with a sky mesh being used with regard to the top camera view and the ground mesh being used for the ground image captured by the downward facing camera. While the masks for the top and bottom images are round in nature, the masks applied to the sector images are truncated to reflect that top and bottom portions of the scene area will be supplied by the top and bottom cameras respectively.

Figure 6:
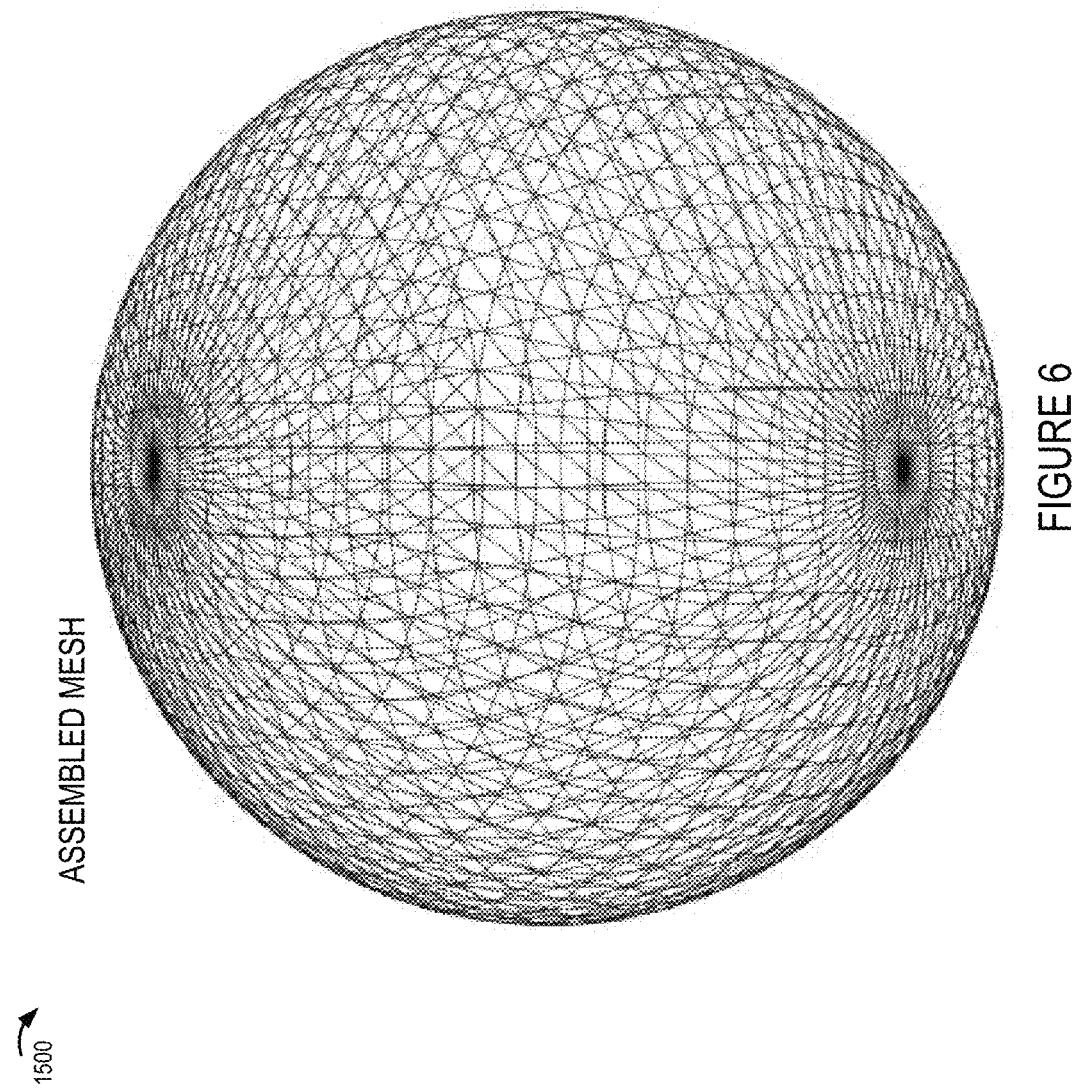
FIG. 6 shows the full assembly of 5 meshes to create a spherical simulated environment

When combined the overall meshes corresponding to different cameras results in a spherical mesh 1500 as shown in FIG. 6. Note that the mesh is shown for a single eye image but that it is used for both the left and right eye images in the case of stereoscopic image pairs being captured.

Mesh and masking information of the type shown in FIG. 5 can and sometimes is communicated to the playback device. The communicated information will vary depending on the rig configuration. For example if a larger number of sectors were used masks corresponding to each of the sectors would correspond to a small viewing area than 120 degrees with more than 3 environmental grids being required to cover the diameter of the sphere.

Environmental map information is, in some embodiments, optionally transmitted to the playback device. It should be appreciated that the environmental map information is optional in that the environment may be assumed to be a default size sphere in the event such information is not communicated. In cases where multiple different default size spheres are supported an indication as to what size sphere is to be used maybe and sometimes is communicated to the playback device.

Image capture operations may be performed on an ongoing basis during an event particularly with regard to each of the 3 sectors which can be captured by the camera rig 102.

Note that while multiple camera views are captured corresponding to different sectors the image capture rate need not be the same for all sectors. For example, a front facing sector corresponding to e.g., the main playing field may capture images at a faster frame rate thant the cameras corresponding to other sectors and/or the top (sky) and bottom (ground) views.

Drawing 2100 of FIG. 7 illustrates mapping of an image portion corresponding to a first sector to the corresponding 120 degree portion of the sphere representing the 3D viewing environment.

Images corresponding to different portions of the 360 degree environment are combined the extent needed to provide a contiguous viewing area to the viewer, e.g., depending on head position. For example, if the viewer is looking at the intersection of two 120 degree sectors portions of the image corresponding to each sector will be seemed and presented together to the viewer based on the know angle and position of each image in the overall 3D environment being simulated. The seeming and generation of an image will be performed for each of the left and right eye views so that two separate images are generated, one per eye, in the case of a stereoscopic implementation.

Drawing 2200 FIG. 8 shows how multiple decoded, corrected, and cropped images can be, and sometime are, mapped and seemed together to create a 360 degree viewing environment which can be used as a background to which foreground images of objects represented by point cloud data can be applied.

FIG. 9 shows a method 900 of operating a content capture and delivery system, such as the one shown in FIG. 1 which comprises stereoscopic image capture system 102 and content delivery system 104, for capturing images and generating point clouds of objects, e.g., foreground objects, and which can also provide background image content in cases where the background is captured at the same environment as the foreground objects.

The method 900 starts with the image capture system 102 capturing stereo pairs of an environment, e.g., basketball court or other area. Image 902 represents one of a pair of captured images forming a stereo pair with a captured stereo pair including a left image and a right image which will differ slightly due to the difference in the location of the first camera used to capture the left image and the location of a second camera used to capture the right image of a stereo image pair. Multiple stereo pairs will be captured and processed with each stereo pair corresponding to a successive frame time. Arrow 904 represents the communication of the captured stereo pairs 906 to the content delivery system 104 for processing. Thus it should be appreciated that an object, e.g., figure such as a basketball player, may change location from one frame time to the next. As a result a portion of the background obscured by a figure during one frame capture time may be visible in another different frame capture time due to the movement of a figure or another object. The processing shown in FIG. 9 in some embodiments is performed by the image processing, calibration and encoding device 112 of the content delivery system 104. In step 908 the images of the captured stereo pairs undergo a lens de-warping operation to compensate for the effect of the camera lenses. The de-warped images of each frame pair are subjected to disparity processing in step 910 to identify differences between left and right images to determine the depth of objects. Based on the disparity information, depth information, e.g., depth maps, are generated and stored in memory. In FIG. 9, element 912 represents a left image of a stereoscopic pair and element 916 represents the corresponding depth information. Similarly, reference 914 is used to identify a right eye image and element 918 is the corresponding right eye image depth information generated in step 910.

In addition to generating depth information, the disparity processing 910 identifies key points 920 in the frame pair. These key points 920 can be used for reference purposes when aligning images over time and may correspond to fixed background points or reference markers intentionally included at the site where the images are captured to facilitate alignment of left and right eye images and multiple images over time based on the fixed location of the key points 920.

The images 912 and 914 and corresponding depth information 916, 918 are used to identify objects and define a cloud of points with corresponding color information that can be used to define one or more foreground objects. The point cloud information 922 is generated for individual objects, along with color information C for each frame time period. The point cloud defines a set of vertices in 3D space, e.g., with each point including an X, Y and Z coordinate in some embodiments. The points are used to define a foreground object. In some embodiment each vertice, e.g., point, corresponds to an individual face for which a color value is supplied. The faces maybe determined based on a predetermined method which allocates the area between points to a corresponding point or some other approach where a surface defined by the points is divided into faces. Thus with each face of the object a particular color is associated. This is different than applying a texture which may and often does include applying multiple colors to a portion of a mesh. In the case of the point cloud approach used in some embodiments a single color is applied to each face of a foreground object allowing for the color to be communicated as a single pixel value in some embodiments and being directly associated with a vertex defining a point inside a face to which the vertex corresponds. The color information provides color values corresponding to individual faces of the object defined by the point cloud. The point clouds define a set of faces where a face corresponds to an area defined by connecting points by lines. The position in the point clouds for an object, e.g., character, is updated from one frame time to another. Thus the object will move over time as the points in the cloud move. However from one frame time to another only a small number of points might change location. To render an object represented as a point cloud, faces are first defined based on the point cloud information and then color is applied to the faces of the object defined by the point cloud information. Points of the point cloud may be, and sometimes are, specified in 3D space as X,Y,Z point locations. The set of information 926 represents point cloud information for at frame time T1 for a first object. The set of information 928 represents point cloud information for the first object at frame time T2. Between T1 and T2 the locations of the points may change resulting in different point locations in the set of points representing the object point cloud but the color of the faces, represented by the set of color information C1, in the point cloud remains the same. Each color can be represented by a single pixel value in some embodiments including with the color pixel value communicating an R, a G and a B color value for each individual component of the color pixel which includes R, G and B components. The point cloud information 926 is combined with background information to generate a stereoscopic frame pair including frames 940,941 corresponding to frame time T1 with the foreground objet represented as a rectangle being generated based on the point cloud information and corresponding color information. The point cloud information 928 is combined with background information to generate a stereoscopic frame pair including frames 944, 946 corresponding to frame time T2.

Between frame times T1 and T2 tweening 930 is performed to generate one or more frames. Inbetweening or tweening is a process of generating intermediate frames between two images to give the appearance that the first image evolves smoothly into the second image. Tweening 930 is used to generate the frame pair 942, 943 which corresponds to a point in time between frame time T1 and frame time T2 and involves interpolating point locations for points in the point cloud used to represent a foreground object. Note that tweening result in the object, a cube, being placed in images 942, 943 at a location which is between the position of the cube in the images corresponding to T1 and T2 as should be expected given that left and right images 943, 942 correspond to a time period between time periods T1 and T2.

In various embodiments the point clouds 926, 928 and 929 are communicated to a playback device, e.g., with background image information being sent separately so that the playback device can use the point clouds and related information for generating video 950, augmented reality image sequences 952 and for supporting what is sometimes referred to as Six Degrees of Freedom (6DoF) playback 954 where a user can alter the position from which he views a scene.

FIG. 10 shows a method 1000 implemented by a playback system, such as the playback device 122 which maybe a cell phone or another device capable of receiving data, decoding and rendering images which are then displayed on a display of the playback device or coupled to the playback device. In some embodiments the playback device is a cell phone or the playback system 300 in which the processor controls the playback device to implement the steps of anyone of diagrams of the present application showing steps of a playback method or steps performed by a playback device.

In the method 1000, background image data 1002 for constructing one or more background images, e.g., stereoscopic background images is received. The background image data includes background geometry information 1004, e.g., information defining a mesh model to which texture information 1006 is to be applied in accordance with a UV map which maps portions of the texture 1006 to portions of the mesh model. In the background approach a UV map 2008 is used to determine how to cave up and apply portions of the texture 1006 to the background. The texture maybe and sometimes is a 2D image that was captured by a camera. In addition to the background data 1002, the playback device receives foreground object information which rather than use a texture, UV map and mesh model, uses point clouds and color information to define one or more foreground objects. While positions of the points in the point cloud will change as a shape deforms or changes position over time but the color. Color information 1010 is supplied with the point cloud information and indicates colors to be applied to individual faces of an object generated based on the point cloud information. While the position of points in the point cloud may change over time the number of points is often kept the same to reduce or avoid the need to provide varying numbers of face color information since the number of faces will remain constant in many cases as the number of points used to define an object is held constant. The point cloud information maybe and sometimes is updated on a per frame basis while the corresponding color information used to color the faces of an object maybe held constant or change at a lower rate than point location information defining a foreground object. Foreground object information is received for one or more objects in each frame. The background data 1002 normally remains unchanged for extended periods of time. Updating of point locations can be performed in a data efficient manner since all the information defining a frame need not be resent for each frame time. Thus it should be appreciated that foreground and background image data sets 1002, 1003 include different types of information but each set of information is capable of providing information suitable for rendering 3D images.

From the discussion of background 1002 and foreground data 1003 it should be appreciated that video information 1016 received by the playback device includes background geometry information (e.g., a mesh model) but foreground information in the form of point cloud object information with coloring information. The foreground point cloud information is updated more frequently than the background information to support movement of figures and/or other foreground objects in a data efferent manner without having to communicate data corresponding to an entire frame during each frame time. The client, e.g., playback device, will perform composite rendering in step 1018 which involves generating the background by applying the background texture 1006 to the background mesh model 1004 in accordance with the UV map 1008 and then rendering foreground objects using the point clouds used to define the foreground object shapes and coloring the foreground object faces with the colors specified in the color information 1010. Foreground objects are updated, at least in terms of point positions, each frame time of a video sequence or as the foreground object or objects change position or shape.

Playback rendering steps are shown in box 1020 and include loading 1002 of vertices of the background geometry to generate the background mesh model, applying the background texture 1006 in step 1024 to the background mesh model in accordance with the UV map 1008, loading the points, e.g., vertices, of the point cloud defining the foreground object or objects and color information, defining based on the loaded information the shape of the object faces in step 1028, e.g., in accordance with a predetermined method of connecting the vertices to define the faces, and then rendering the faces of the foreground object by applying the color specified to a face in the set of color information 1010 to the corresponding face. This results in a foreground object such as the one shown in box 1023, with box 1034 representing a background image generated by background rendering steps 1022, 1024. Image 1036 represents a left or right eye image generated by applying the foreground object 1032 rendered from point cloud and color information on the background 1034. Separate left and right eye images can and sometimes are generated based on separate point cloud location values provided for the foreground objects detected to be present in left and right eye images. Thus while a single composite image 1036 is shown the method would normally result, for stereoscopic images, with different left and right eye images 1036 being generated for stereoscopic frame pair. It should be appreciated that the location of points defining a foreground object may and sometimes will be different for left and right eye images reflecting the positional difference in the location of an object as it is captured by left and right cameras or would be viewed by left and right eyes positioned at slightly different locations.

Figure 11:
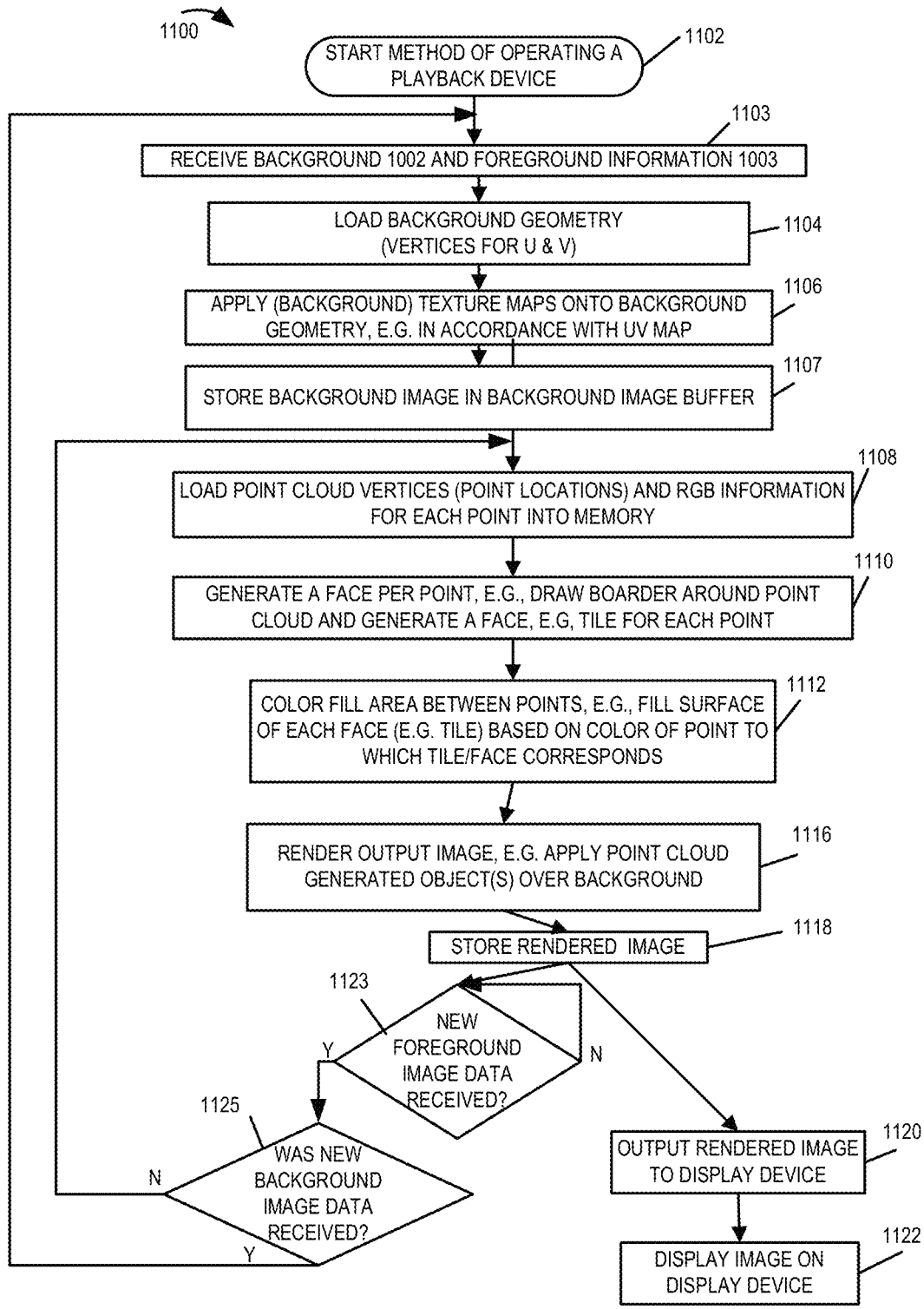
FIG. 11 shows the steps of operating a playback device, such as the one of FIG. 3, to generate images from data such as that which is described in FIG. 10 as being supplied to a playback device.

FIG. 11 shows the steps 1100 of a method of operating a playback device, e.g., the playback device or system shown in any of the other figures of this application, to generate images from data such as that which is described in FIG. 10 as being supplied to a playback device. The playback device implementing the method 1100 can be the playback system or device shown in any of the other figures of the application. In the FIG. 11 method, while background and foreground information can be updated at the same rate, in some embodiments foreground point cloud information used to define one or more foreground objects and/or corresponding color information is updated at a faster rate than the background texture that are applied to a background mesh model to generate a background images.

The method starts in step 1102 with operation progressing to step 1103 in which background images information 1002 and foreground information 1003 previously discussed in regard to FIG. 10 is received. The background information includes mesh model information 1004, a UV map 1008 and texture 1006. The texture 1006 maybe and sometimes is in the form of a frame which is to be segmented and applied to the background mesh model based on the information included in UV map 1008. Received foreground image data includes color information and point cloud information. The point cloud information specifies locations, e.g., X,Y,Z, coordinates, of vertices used to define the shape of a foreground object. The position information can be fore one frame of a stereoscopic frame pair with different points defining the location of the same foreground object in a left frame or a right frame of a single set of points maybe communicated with displacement information indicating how to offset the points to form separate sets of left and right image points defining an object. Color information 1010 is included and provides color information indicating a color to be applied to faces of the foreground object defined by the point cloud. The color information maybe and sometimes is provided in the form of one color pixel value for each face of the foreground object allowing for a very compact data representation of the foreground object color information. A single set of color information maybe used to color the foreground object in both the left and right eye images of a stereoscopic pair since the position of the object appears at different locations in the left and right eye images but the colors should be the same in most cases.

With the foreground and background information having been received in step 1103 for one or more frame time periods, operation proceeds to step 1104 in which the background geometry is loaded into memory. Then in step 11-6 the background texture 1006 is applied to the background geometry, e.g., mesh model, in accordance with the mapping information included in the received UV map 1008. The rendered background generated in step 1107 is then stored in memory for merging with foreground objects corresponding to different frame times which use the same background.

In step 1108 point cloud vertices and color information used to color the faces of a foreground object corresponding to a frame time are loaded into memory in step 1106. Then in step 1110 faces corresponding to the points are generated. In some embodiments this involves drawing a shape around the points with the constructed number of faces equaling the number of points. In one such embodiment the number of points corresponds to the number of specified colors and also the number of faces.

Operation proceeds from step 1110 to step 1112 in which the area between points, corresponding to a face in which a point is located, is filed with the color corresponding to the point in the face. In this way faces are colored based on the color corresponding to the point. Then in step 1116 the foreground object or objects generated by the face rendering and coloring are applied to the background image to generate an output image. The position of an object generated in 1116 maybe placed at different locations based on difference information communicated with the foreground object information which indicates how the foreground object should be applied to a left eye background at a different location than it is applied to the background to generate the right eye image. Separate left and right eye images maybe and sometimes are generated in step 1118 to support stereoscopic image display. The output images generated in step 116 are stored in step 118 prior to being output to a display device in step 1120 after which the images are displayed in step 1122 to a user with a user being displayed a left eye image to a left eye and a right eye image to a right eye in the case of a stereoscopic display.

In step 1123 a check is made to determine if new foreground image data was received. If no new foreground image data was received operation proceeds again to step 1123 where processing will wait until new foreground image data, e.g., image data corresponding to another frame time is received. In step 1123 if new forground image data is received, e.g., image data corresponding to another frame time, operation proceeds to step 1125 in which a check is made to determine if new background data was received which would require updating of the previously rendered background image in addition to the foreground object information. As previously noted foreground object information, foreground point cloud values, will normally be received and updated more frequency than the background image information. If in step 1125 it is determined that updated background information was received operation returns to step 1103 to start the processing of the background image data prior to rendering the foreground image data. If in step 1125 it is determined that updated background image data has not been received operation proceeds to step 1108 so that the foreground image data can be processed and a new image generated from the new foreground point cloud information and the previously rendered background image data.

The use of point clouds and color information to represent foreground objects whose position in 3D space is updated more frequently than the background information communicate as a texture, UV map and background mesh model allows for updates of foreground object positions and shapes using relatively little data making the method of the present invention well suited for applications where the amount of data that can be transmitted and/or received by a playback device is limited, e.g., because of wireless data transmission constraints or for other reasons.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:

1. A method for communicating point cloud information to a playback device, the method comprising:
    obtaining a geometry model for an environment, a background image configured to be applied to the geometry model as a texture, and a set of point cloud information defining a foreground object in the environment; and
    communicating, to the playback device, at least one updated set of point cloud information without the geometry model and the background image.

2. The method of claim 1, further comprising:
    communicating, to the playback device, a UV map comprising information indicative of how to apply the background image to the geometry model.

3. The method of claim 1, wherein the set of point cloud information and the at least one updated set of point cloud information comprise information for a same number of points, wherein location information for one or more points in the at least one updated set of point cloud information differs from location information for one or more corresponding points in the set of point cloud information.

4. The method of claim 1, wherein the set of point cloud information comprises location information and color information for a plurality of individual points which define the foreground object.

5. The method of claim 1, further comprising:
generating the background image from a plurality of images captured at different times.

6. The method of claim 5, wherein generating the background image from the plurality of images captured at different times comprises:
identifying the foreground object in a first image captured at a first time; and
replacing the foreground object in the first image with image content from a second image captured at a second time to form the background image.

7. The method of claim 6 wherein a position of the foreground object in the second image captured at the second time is different from a position of the foreground object in the first image captured at the first time.

8. The method of claim 1, further comprising:
generating an additional updated set of point cloud information defining the foreground object;
communicating, to the playback device and at a first update frequency, the additional updated set of point cloud information; and
communicating, to the playback device and at a second update frequency, an updated background image configured to be applied to the geometry model as a texture, wherein the second update frequency is less than the first update frequency.

9. A system, comprising:
a memory; and
a processor coupled to the memory and configured to execute program instructions stored in the memory to cause the system to:
obtain a geometry model for an environment, a background image configured to be applied to the geometry model as a texture, and a set of point cloud information defining a foreground object in the environment; and
communicate, to a playback device, at least one updated set of point cloud information without the geometry model and the background image.

10. The system of claim 9, wherein the processor is further configured to execute program instructions to cause the system to:
communicate, to the playback device, a UV map comprising information indicative of how to apply the background image to the geometry model.

11. The system of claim 9, wherein the set of point cloud information and the at least one updated set of point cloud information comprise information for a same number of points, wherein location information for one or more points in the at least one updated set of point cloud information differs from location information for one or more corresponding points in the set of point cloud information.

12. The system of claim 9, wherein the set of point cloud information comprises location information and color information for a plurality of individual points which define the foreground object.

13. The system of claim 9, wherein the processor is further configured to execute program instructions to cause the system to:
generate the background image from a plurality of images captured at different times.

14. The system of claim 10, wherein the processor is further configured to execute program instructions to cause the system to:
generate an additional updated set of point cloud information defining the foreground object;
communicate, to the playback device and at a first update frequency, the additional updated set of point cloud information; and
communicate, to the playback device and at a second update frequency, an updated background image configured to be applied to the geometry model as a texture, wherein the second update frequency is less than the first update frequency.

15. A system, comprising:
a memory; and
a processor coupled to the memory and configured to execute program instructions stored in the memory to cause the system to:
obtain a geometry model for an environment, a background image configured to be applied to the geometry model as a texture, and a set of point cloud information defining a foreground object in the environment;
communicate, to a playback device, at least one updated set of point cloud information without the geometry model and the background image;
generate an additional updated set of point cloud information defining the foreground object; and
communicate, to the playback device and at a first update frequency, the additional updated set of point cloud information.

16. The system of claim 15, wherein the processor is further configured to execute program instructions to cause the system to:
communicate, to the playback device and at a second update frequency, an updated background image configured to be applied to the geometry model as a texture, wherein the second update frequency is less than the first update frequency.

17. The system of claim 16, wherein the processor is further configured to execute program instructions to cause the system to:
communicate, to the playback device, a UV map comprising information indicative of how to apply the background image to the geometry model.

18. The system of claim 16, wherein the set of point cloud information and the at least one updated set of point cloud information comprise information for a same number of points, wherein location information for one or more points in the at least one updated set of point cloud information differs from location information for one or more corresponding points in the set of point cloud information.

19. The system of claim 16, wherein the set of point cloud information comprises location information and color information for a plurality of individual points which define the foreground object.

20. The system of claim 16, wherein the processor is further configured to execute program instructions to cause the system to:

generate the background image from a plurality of images captured at different times.

\* \* \* \* \*